Patented Oct. 3, 1939

2,175,090

UNITED STATES PATENT OFFICE 2,175,090

PURIFICATION OF ANTIBODY COMPOSITIONS

Ivan Alexandrovich Parfentjev, Nyack, N. Y., assignor to Lederle Laboratories, Inc., New York, N. Y., a corporation of Delaware No Drawing. Application June 22, 1938,
Serial No. 215,233

8 Claims. (Cl. 167—78)

This invention relates to the purification of antitoxin and similar biological solutions by a method which includes the selective digestion of certain of the proteins contained in serum, plasma, or other body fluids. The invention is particularly concerned with the application of this method to the concentration of such materials containing antibodies and the like, to a degree hitherto considered unattainable.

Serum and similar fluids from which antitoxins and the like are customarily obtained, contain several different proteins which are principally considered as albumins, euglobulins and pseudoglobulins. The antibodies contained in the serum are ordinarily associated almost entirely with the pseudoglobulin. Hence in any method of purifying and concentrating serum solution containing valuable antibodies, it is considered desirable to remove the albumin and euglobulin as completely as possible without destroying the antibodies associated with the pseudoglobulin fraction.

The customary method of refining and concentrating antitoxins has entailed making fractional precipitations of the different proteins contained in the native antitoxic serum, such precipitations being made by the addition of various inorganic salts in differing concentrations. The salt most commonly used for this purpose is ammonium sulfate.

Thus, with ammonium sulfate used in a concentration of 30 to 33% of a saturated solution, a globulin precipitate containing very little antitoxin is obtained. This precipitated fraction is generally referred to as the euglobulin fraction and is commonly filtered off and discarded. The filtrate is treated with more ammonium sulfate until the concentration is 50% by volume of saturated ammonium sulfate solution. At this concentration, a further precipitation is obtained which is commonly refered to as the pseudoglobulin fraction and contains the antitoxin. There remains in solution practically all of the albumin fraction originally present in the serum, and this solution is mostly free from antitoxins, so that in the case of the second precipitation, the filtrate is discarded and the precipitate saved. The precipitate is redissolved and this solution is generally used as such.

In my Patent No. 2,065,196 and in my application Serial No. 107,227 (Patent 2,123,198 of July 12, 1938) of which the present application is in part a continuation I have shown that it is possible to purify and concentrate the antitoxin in antitoxic serum or like solution containing valuable antibodies by treating the solution with proteolytic enzymes under such conditions as to prevent any substantial destruction of the antibodies. In this way, I have been able to digest the valueless albumin fraction, practically completely, with substantially no destruction of antibodies contained in the globulin fraction. Further, I have described separation of the euglobulin fraction, which is practically free from antibodies, from the pseudoglobulin fraction with which the antibodies are principally associated. And still further, I have shown that I may concentrate and purify my antitoxin solutions to an even greater extent by treating the material after the digestion to other precipitation, filtration, dialysis, absorption, etc. steps, all carried out under suitable conditions and with proper materials.

In the applications of my digestion methods, the fraction of proteins commonly considered as albumins digests first and to such a degree that the products of digestion are largely dialyzable; that fraction commonly referred to as euglobulins is partially digested and the remainder is precipitated by the acid present, the digestion being carried out under acid conditions and that protein fraction referred to as pseudoglobulins while digested and/or modified to some extent, at least in part remains in solution retaining practically all of the original antibody activity.

I have found that I am able to carry out the digestion for a relatively short period of time using solutions even as acid as pH 3.0 (glass electrode method) and by so doing may obtain results which are even superior to those previously attained.

To better illustrate the invention, the following is a specific example of one method of carrying out my procedure as applied to the purification of diphtheria antitoxin, it being understood that the example is merely by way of illustration and not in limitation.

Any suitable quantity of diphtheria antitoxin serum is diluted with two times its volume of saline solution or water and the mixture is acidified slightly to pH 5.0–6.0. To this mixture I add pepsin (preferably purified U. S. P.) in an amount equivalent to about 20 grams of pepsin per liter of original serum. Acid is then added slowly until the mixture has a pH of 3.0 to 3.2. Digestion is allowed to proceed at a temperature of about 37° C. for a period of two to six hours or shorter from the addition of the pepsin, until about 75% of the serum proteins have been digested or changed so that they are non-coagulable on heating. The liquid at the completion of digestion has a pH of about 4. The reaction is then adjusted to pH 5.4–6.0.

The digested material is filtered to separate solid materials (euglobulin, etc.) from the liquid. The separated liquid is neutralized and may be further treated by subjecting it to ultra-filtration using a suitable colloidal membrane in any proper apparatus. The filtrate is discarded and the concentrate obtained by the ultra-filtration has a specific gravity of about 1.025 to 1.030. This liquid is a transparent and clear product which may be used, if desired, as the finished antitoxin material. This solution is a highly purified, concentrated antitoxin having a potency considerably greater than the original serum and also greater than antitoxin concentrates obtained by the customary ammonium sulfate method.

However, I have found that it is possible to process the liquid from the digestion described above, and before ultra-filtration, to obtain an even superior antitoxin solution. To do this, I add to the described neutralized liquid, solid ammonium sulfate in the amount of about 300 grams per liter of concentrated solution. The ammonium sulfate quickly dissolves in the liquid and causes the precipitation of a fraction of coagulable proteins (pseudoglobulins) which contain practically all of the antitoxins. There remain in solution the residual peptones, proteoses and other split products of digestion not removed by ultra-filtration, all of which are undesirable and worthless in the final antitoxin preparation. The precipitate is then separated from the liquid in which it is suspended and the liquid is discarded.

The last mentioned precipitate comprises chiefly a remaining pseudoglobulin fraction with substantially the entire antitoxin content of the original serum. This precipitate is dissolved in water and reprecipitated with ammonium sulfate as just described. The reprecipitated precipitate is dissolved and the resulting solution is subjected to dialysis to remove ammonium sulfate and other undesired materials. In dissolving the precipitate, it is preferred that the least amount of water be used that will give complete solution, since the dialysis takes place more efficiently, the more concentrated the solution.

The dialysis of the solution may be carried out in any suitable apparatus, using any suitable membrane. One method commonly employed is to place the solution to be dialyzed in a bag or other convenient container having a dialyzing membrane of cellophane or other suitable material, and to suspend this bag or the like in a bath of water. By means of a suitable mechanical arrangement the container is subjected to an up-and-down motion in the bath. In about 24 hours, at room temperature, dialysis is sufficiently complete. The dialysis method using cellophane bags without the motion ordinarily takes four days for completion and must be carried out in the cold to prevent bacterial growth.

After the dialysis is complete, the solution is taken out of the dialyzer and is diluted by the addition of two to three times its volume of water. To the resultant liquid acid is added (lactic acid is a satisfactory acid) until the reaction is brought to pH 5.4 which causes a precipitation of an "acid fraction". This acid precipitate is separated and the resultant liquid brought back to neutral with sodium hydroxide, after which I prefer to add a suspension of tricalcium phosphate in water, in the proportion of about 4% to 20% by volume of the suspension to the total volume. A freshly prepared tricalcium phosphate suspension contains about 3 to 5% very finely divided solid calcium phosphate. The entire mixture is then stirred for about 24 hours at room temperature and the calcium phosphate is filtered from the solution. It is found that the calcium phosphate absorbs a considerable fraction of protein that carries with it almost no antitoxin. The phosphate also absorbs lipoids, pepsin residues, and coloring materials which were in the solution, with the result that the products are almost colorless or water-white. All of this is accomplished without any substantial loss of antibody.

Instead of adding the tricalcium phosphate in one operation as described above, I find that even better results are obtained if the phosphate is added in smaller amounts and the treatments are repeated several times. Thus, using the same suspension as described above, I add to the liquid after dialysis an amount of the suspension corresponding to about 4–5% by volume as based on the total volume. This mixture is then stirred for about 1 to 2 hours and is filtered. A similar addition, stirring and filtration operation is repeated four or five times with very little loss of antibody. By the multiple stage treatment with the phosphate I have found that I may obtain a better product having a higher potency than by the previous method. This is probably due to the fact that the calcium phosphate is a selective absorbent in that it absorbs units of potency in arithmetic progression but absorbs the protein in geometric progression. Each treatment with the phosphate absorbs 15–20% of the protein from the solution.

The filtrate obtained after removal of the calcium phosphate is preferably subjected to an ultra-filtration operation, using a suitable colloidal membrane. By this operation, the final concentration is regulated so that the liquid obtained has a specific gravity of about 1.060. This material is a highly purified, concentrated antitoxin solution which is exceedingly transparent, clear and substantially colorless. The finished material has an average potency of ten times or more than that of the original serum. This purified and concentrated antitoxin in about neutral solution is further characterized by the fact that it is relatively stable and that no precipitate forms on standing, even over long periods of time.

The details of the described procedure may be varied within certain limits, as may be indicated by experience. The finished antitoxin may be prepared by digesting, in accordance with the present method, antidiphtheric blood, serum or plasma. My method also may be applied to the further purification and concentration of antitoxin previously prepared by any other method, e. g., the ammonium sulfate method.

One of the outstanding features of my process is that the pepsin or similar enzyme in proper concentration, protects the antibody activity against destruction by acid. I have shown this to be true by adding the same amount of acid to similar antibody solution to which pepsin had not been added, and in this case the antibody destruction is considerably greater. Further, under the conditions of my process, the globulin fraction is more resistant to digestion than the albumin fraction, so that practically a total destruction of the albumins may be achieved without there being enough digestive action on the pseudoglobulin fraction to destroy an appreciable amount of its antibody activity.

One of the outstanding advantages of my present invention is the shortened period of digestion and the more acid pH, both of which favor the prevention of bacterial development during the process and bring about a greater alteration of the allergenic character of the proteins retained so that they lose more of their original specific reaction-producing quality. Thus, it is well-known that many persons are sensitive or allergic to serum proteins such as horse serum proteins. The peptic digestive material prepared in accordance with my method is only 1/500 as active to persons sensitive to horse serum proteins as are the usual horse serum antitoxins prepared by the ammonium sulphate methods of the prior art. The lower rate of serum sickness of my material has been determined in numerous hospitals and clinics. Antitoxins prepared by this new method when tested against anti-horse serum precipitating antibody show only traces of normal precipitin while salted-out antitoxins give a voluminous precipitate.

While I prefer to add the enzyme to the serum prior to the final adjustment of acidity, it will be obvious that my process can be carried out by adding the enzyme with the proper amount of acid to the serum simultaneously. It is also possible to adjust the acidity to the desired point prior to the addition of the enzyme, provided that the enzyme is added to the acidified serum very shortly after acidification, since any considerable delay might permit the acid to destroy a substantial amount of the antibodies. Thus it is seen that, by the use of the proper technique, the enzyme may be added before, at, or after acidification without substantial destruction of the antibodies, and such modifications are clearly within the purview of the present invention.

It is best that the digestion be carried out in diluted solutions since with too high concentrations, the proteolytic enzymes may fail to protect the antibodies sufficiently. Ordinarily this dilution is to the extent of about two to four times the original volume. The hydrogen ion concentration is adjusted by adding a corresponding amount of acid, as may be needed. The time of digestion may be varied, depending upon variations in dilution, pH, temperature, the degree of digestion desired and the like.

For best results I prefer to use the step of salting-out that portion of the proteins with which the antibodies are associated after digestion and ultra-filtration and prior to the treatment with calcium phosphate. This step eliminates the peptones and proteoses which interfere with the absorptive action of the calcium phosphate. In place of ammonium sulphate as the salting-out medium, I may use such other suitable neutral salts as sodium sulphate, sodium chloride, etc.

The use of ammonium sulphate or similar salts for treating the liquid obtained from my digestion operation, is considerably different from the prior art use of ammonium sulphate. In the present process, the digestion step eliminates the albumin and euglobulin fractions to such an extent that a single precipitation with the salt is sufficient to bring down the remaining pseudoglobulin fraction with which the antibodies are associated. The previously used fractional precipitations using varying strengths of ammonium sulphate merely served to separate the antibodies from certain proteins with which by my method have already been disposed of.

The tricalcium phosphate utilized as the absorbent in one of the later stages of my process is preferably in the form of a very finely divided material. In fact, I have found that the more finely divided the calcium phosphate, the better are the results obtained. In place of tricalcium phosphate I may utilize the corresponding phosphates of the other alkaline earth metals such as magnesium, barium, strontium, etc., or mixtures of the various phosphates or other absorbents such as charcoal.

The treatment with calcium phosphate is especially effective in combination with the digestion step, since the digestion eliminates a large proportion of undesirable material from the antibody solution and the subsequent absorption treatment with the calcium phosphate is more efficient. Furthermore, the calcium phosphate treatment is so effective that it is possible to stop the digestion when about 70–75% of the protein is digested or is converted so that it is non-coagulable on heating. This is an important point since, as the digestion nears completion, there inevitably results some added destruction of the antibodies in the later stages of the digestion process. To obtain an antitoxin solution equivalent in potency, without the calcium phosphate treatment, it is necessary to digest until about 90% of the proteins become non-coagulable on heating. However, digestion to this extent causes some destruction of the antibodies. Any considerable destruction is avoided by stopping the digestion at the 70–75% point and subsequently removing certain proteins in the manner described in my preferred process.

In addition to the advantages pointed out, the calcium phosphate removes enzyme, coloring matters, lipoids, etc. from the liquid after digestion. The removal of lipoids by the calcium phosphate is an especially outstanding advantage, since it was previously advisable to permit the concentrated antitoxin solutions to stand for several weeks for ageing. During this ageing the lipoids separated out and the precipitate was filtered off before the antitoxin was used. By the present process the material can be made and shipped out for use without ageing, since the calcium phosphate completely absorbs the lipoids from the antitoxin solution. The calcium phosphate also removes the pepsin or other enzyme which may remain from the digestion step. This is likewise an important advantage since it permits an even closer approach to the preparation of the ideal antitoxins associated with the least possible foreign matter.

As an additional step which may be utilized, the serum or plasma may be heated prior to the digestion step in order to precipitate fibrin and this precipitate is preferably removed before carrying the process further. To preserve the antibody activity and to prevent bacterial growth, I previously found it desirable to add to the serum or plasma a very small amount of a preservative material such as phenol, a mercurial preservative, etc., but in view of the very short digestion period and higher acidity when I use above, such materials are not needed and preferably are not used.

As described above, if the digestion is sufficiently complete, a precipitated, undigested portion of the serum protein is separated from the solution which contains the soluble products of digestion and a residual portion of the protein associated with the antitoxin. The antitoxin solution is then concentrated by any suitable method, such as by ultra-filtration, previously described, dialysis and evaporation, precipitation, absorption or the like, until a suitable purification and concentration of antitoxins is established.

In place of the proteolytic enzyme, pepsin, already discussed, I may use other suitable enzymes, or mixtures of the various enzymes. The enzymes, under the conditions prevailing in the digestion procedure, protect the antitoxins or other antibodies from destruction. This is true even though the digestion is carried out in an acid medium which, in the absence of the enzyme, would destroy most, if not all, of the antitoxins. The present process is applicable to the purification of all known antitoxins.

The antitoxins prepared according to my method are used as such for injection into animals or human beings for protecting them against the corresponding toxin. It is evident that the high potency of my material permits the injection of smaller volumes to obtain the same results as were previously obtained with larger volumes of the usual antitoxins. Likewise larger amounts of antibodies may be injected by the use of smaller volumes of my products, as compared with the usual antitoxins. Moreover, antibodies as existing in this solution are associated with proteins largely altered to such a degree from their original allergenic quality that reactions are less frequently encountered. This has been a most important advantage in scarlet fever streptococcus antitoxin where the previous large-volume doses of unaltered protein caused reactions sufficient to prevent in many cases the use of the needed antitoxin and in staphylococcus antitoxin where, in its native state, reactions were sufficient so that the intravenous application of the antitoxin was advised against, whereas with this new antitoxin intravenous medication has been used satisfactorily.

This process is applicable to the purification of all known antitoxins, including diphtheria antitoxin, tetanus antitoxin, hemolytic streptococcus antitoxin, staphylococcus antitoxin, erysipelas antitoxin, the gas gangrene antitoxins such as perfringens antitoxin, vibrion septique antitoxin, oedematiens antitoxin, histolyticus antitoxin, sordelli antitoxin, as well as botulinus type I antitoxin, botulinus type II antitoxin, and the like. It is also applicable to the antitoxins known as antivenoms, such as anticrotalus venom, anti-cobra venom and anti-moccasin venom, and the like. It may also be used in the treatment of the antivirus and antibacterial serums such as antidistemper serum, antipneumococcic serum, antimeningococci serum, antistaphylococcic serum, antidysenteric serum (both antibacterial and antitoxic), and the like.

I have found that the digestion method described for the purification of antitoxins may also be used for purifying toxins, bacterial antigens and the like. The antigens are purified without substantial loss of antigenicity. Likewise the toxins may be detoxified in the same manner. Pepsin and trypsin have been found especially effective for such materials as diphtheria toxin, staphylococcic toxin, tetanus toxin, meningococcic antigen, etc.

Throughout the specification and claims I have used the term "pH" to describe hydrogen-ion concentration, since the hydrogen-ion concentration is customarily used to measure acidity. The specific pH values as used herein are all based on determinations by the glass electrode method rather than the colorometric method.

Other suitable changes may be made without departing from the spirit and scope of my invention except as defined in the appended claims.

This application is in part a continuation of my prior application Serial No. 107,227 filed October 23, 1936, Patent 2,123,198 of July 12, 1938.

I claim:

1. A method of purifying a solution containing antibodies associated with proteins, which comprises adding a proteolytic enzyme active in acid media to such solution, adjusting the pH of the solution to about 3.0–3.2 and digesting the proteins without substantial destruction of the antibodies for a period of about 2 to 6 hours from the time of addition of the enzyme.

2. A method of purifying a solution containing antibodies associated with proteins which comprises adding a proteolytic enzyme active in acid media to such solution and digesting without substantial destruction of the antibodies until about 75% of the original protein in the solution is rendered non-coagulable on heating, the digestion being carried out under acid conditions at about pH 3.0–3.2.

3. The process of refining a solution containing serum proteins which comprises subjecting the proteins in solution to the digestive action of an acid-active proteolytic enzyme at about pH 3.0–3.2 until about 75% of the original protein in the solution is rendered non-coagulable on heating, removing any precipitated material from the solution and concentrating the solution.

4. A method of purifying a serum solution containing antibodies associated with serum proteins which comprises adding to the solution an acid-active proteolytic enzyme, selectively digesting the serum proteins without substantial destruction of the antibodies as about pH 3.0–3.2 for a period of about 2 to 6 hours until about 75% of the proteins is rendered non-coagulable by heat, filtering the solution and treating the filtrate with finely divided tricalcium phosphate to absorb undesirable materials from said solution.

5. The process of claim 4 in which the filtrate is treated to salt out the coagulable proteins with which the antibodies are associated, the precipitated fraction is separated and redissolved, and the resulting solution is treated with solid tricalcium phosphate to absorb undesirable materials from said solution.

6. The process of claim 1 in which the enzyme is pepsin.

7. The process of claim 3 in which the enzyme is pepsin.

8. The process of claim 4 in which the enzyme is pepsin.

IVAN A. PARFENTJEV.